(12) United States Patent
Dahl et al.

(10) Patent No.: US 7,276,669 B2
(45) Date of Patent: Oct. 2, 2007

(54) PAYLOAD OVERLOAD CONTROL SYSTEM

(75) Inventors: Kristofor Lee Dahl, Homer Glen, IL (US); Eric Wade Cler, Peoria, IL (US); Wei Li, Peoria, IL (US); Randy G. Aneloski, Channahon, IL (US)

(73) Assignee: Caterpillar Inc., Peoria, IL (US)

( * ) Notice: Subject to any disclaimer, the term of this patent is extended or adjusted under 35 U.S.C. 154(b) by 251 days.

(21) Appl. No.: 10/958,238

(22) Filed: Oct. 6, 2004

(65) Prior Publication Data

US 2006/0070773 A1    Apr. 6, 2006

(51) Int. Cl.
G01G 19/08    (2006.01)
G06F 17/00    (2006.01)

(52) U.S. Cl. .......................... 177/45; 177/136; 701/50; 701/124

(58) Field of Classification Search ............ 177/45–50, 177/136–139; 701/50, 124
See application file for complete search history.

(56) References Cited

U.S. PATENT DOCUMENTS

| | | | | | |
|---|---|---|---|---|---|
| 3,929,244 | A | * | 12/1975 | Ekstrom | 414/636 |
| 4,068,773 | A | * | 1/1978 | Downing et al. | 414/636 |
| 4,168,934 | A | * | 9/1979 | Downing et al. | 414/636 |
| 4,411,582 | A | * | 10/1983 | Nakada | 414/636 |
| 4,511,974 | A | * | 4/1985 | Nakane et al. | 701/124 |
| 4,942,529 | A | * | 7/1990 | Avitan et al. | 701/50 |
| 5,088,879 | A | * | 2/1992 | Ranly | 414/636 |
| 5,105,895 | A | | 4/1992 | Kyrtsos | 177/25.14 |
| 5,188,502 | A | | 2/1993 | Tonsor et al. | 414/700 |
| 5,493,798 | A | | 2/1996 | Rocke et al. | 37/348 |
| 5,509,293 | A | | 4/1996 | Karumanchi | 73/1 |
| 5,666,295 | A | | 9/1997 | Bruns | 364/567 |
| 5,714,719 | A | | 2/1998 | Otsuka et al. | 177/25.11 |
| 5,737,993 | A | | 4/1998 | Cobo et al. | 91/361 |
| 5,848,368 | A | | 12/1998 | Allen et al. | 701/50 |
| 5,955,706 | A | | 9/1999 | Fonkalsrud et al. | 177/136 |
| 6,211,471 | B1 | | 4/2001 | Rocke et al. | 177/136 |
| 6,350,100 | B1 | * | 2/2002 | Naruse et al. | 414/635 |
| 6,437,701 | B1 | * | 8/2002 | Muller | 340/679 |
| 6,518,519 | B1 | | 2/2003 | Crane, III et al. | 177/136 |
| 6,552,279 | B1 | | 4/2003 | Lueschow et al. | 177/141 |
| 6,601,013 | B2 | | 7/2003 | Lueschow et al. | 702/175 |
| 6,721,680 | B2 | | 4/2004 | Sorrells et al. | 702/164 |
| 6,785,597 | B1 | * | 8/2004 | Farber et al. | 701/50 |
| 2005/0281650 | A1 | * | 12/2005 | Bozem et al. | |
| 2005/0281656 | A1 | * | 12/2005 | Bozem et al. | |

* cited by examiner

*Primary Examiner*—Randy W. Gibson
(74) *Attorney, Agent, or Firm*—Finnegan, Henderson, Farabow, Garrett & Dunner

(57) ABSTRACT

A work machine may have a payload overload control system. The system may include a payload carrier and a lift mechanism configured to raise and lower the payload carrier. The system may further include a payload monitor configured to determine a payload in the payload carrier. The system may also include a controller configured to compare the determined payload with a predetermined maximum payload and to selectively control lift of the payload carrier by the lift mechanism based on the comparison between the determined payload and the predetermined maximum payload.

28 Claims, 3 Drawing Sheets

PAYLOAD OVERLOAD CONTROL SYSTEM

TECHNICAL FIELD

The present disclosure is directed to a payload overload control system, and more particularly to a lift disabling payload overload control system.

BACKGROUND

Earthmoving machines such as loaders may be used to move earth, rocks, and other materials from one place to another. These machines may be rated for a particular maximum payload. Lifting and carrying payloads above this maximum payload may be dangerous because the excess weight at an elevated position may make the machine unstable, particularly when driving over uneven surfaces. In addition the machine components such as the lift linkage can fail because they may not be designed to regularly handle payloads in excess of the maximum payload for which the machine is rated. Even if no immediate harm is manifested by an overload, the machine components can wear more quickly.

Systems have been designed to monitor the payload on earthmoving machines. For example, U.S. Pat. No. 6,211,471, issued to Rocke et al. on Apr. 3, 2001, ("the '471 patent") discloses a loader having a payload monitor. The '471 patent further discloses that the loader may dump material from the bucket if the payload determined by the payload monitor is above a desired amount. However, the desired amount above which the '471 patent will dump material is not a maximum payload for the loader itself, but rather for a hauling vehicle that the loader may be loading. The payload monitor adds the payloads from each bucketful and compares the total to the maximum payload of the hauling vehicle. If dumping the measured payload from the bucket into the hauling vehicle would exceed the maximum payload of the hauling vehicle, then the loader may automatically dump some or all of the payload in the bucket in order to avoid overloading the hauling vehicle. Therefore, while the system of the '471 patent may prevent overloading of the hauling vehicle, it does nothing to guard against the ill effects of overloading the loader itself. Further, the system of '471 patent does not prevent lifting of a payload exceeding the maximum rated payload for the loader.

The present disclosure is directed to one or more improvements in existing payload monitoring systems.

SUMMARY OF THE INVENTION

In one aspect, the present disclosure is directed to a work machine payload overload control system. The system may include a payload carrier and a lift mechanism configured to raise and lower the payload carrier. The system may further include a payload monitor configured to determine a payload in the payload carrier. The system may also include a controller configured to compare the determined payload with a predetermined maximum payload and to selectively control lift of the payload carrier by the lift mechanism based on the comparison between the determined payload and the predetermined maximum payload.

In another aspect, the present disclosure is directed to a method of controlling work machine payload overload. The method may include determining a payload carried by a work machine in a payload carrier and comparing the determined payload to a predetermined maximum payload. Lift of the payload carrier may be selectively controlled based on the comparison.

DETAILED DESCRIPTION

Reference will now be made in detail to the drawings. Wherever possible, the same reference numbers will be used throughout the drawings to refer to the same or like parts.

Figure 1:
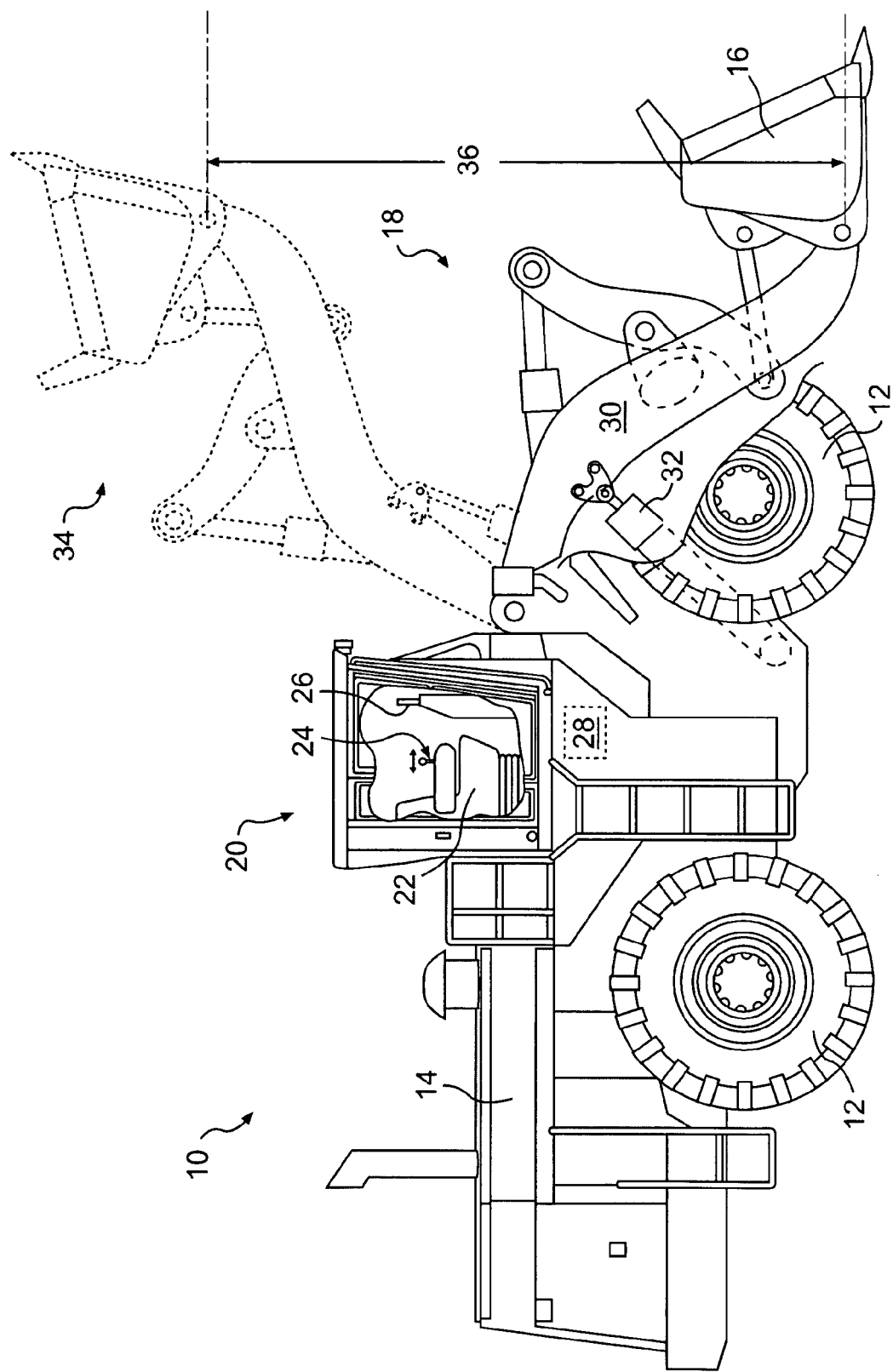
FIG. 1 is a diagrammatic illustration of a work machine according to an exemplary disclosed embodiment.

FIG. 1 shows a work machine 10 having one or more traction devices 12, a power source 14, a payload carrier 16, and a lift mechanism 18. Work machine 10 may further include an operator station 20, which may include an operator seat 22, a lift control device 24, and a warning display 26. Work machine 10 may also include a controller 28.

Although work machine 10 is shown as a wheel loader, work machine 10 may be any kind of machine configured to lift and carry a payload, such as, for example, track type loaders, forklifts, skid steers, etc. Accordingly, traction devices 12 may be any type of traction devices, such as, for example, wheels, as shown in FIG. 1, tracks, bands, or any combinations thereof.

Payload carrier 16 may be a bucket, as shown in FIG. 1. Alternatively, payload carrier 16 may be a platform, forks, or any other means for carrying a payload.

Lift mechanism 18 may include a lift linkage 30, as shown in FIG. 1, or any other means for raising and lowering payload carrier 16, such as, for example, a pulley/cable system, chain drive, or cantilever system. Lift linkage 30 may be hydraulically actuated by one or more hydraulic cylinders. In particular, lift linkage 30 may be raised by actuation of a hydraulic lift cylinder 32. A dashed outline 34 indicates the position of lift mechanism 18 and payload carrier 16 at 100% lift, i.e. the highest position to which lift cylinder 32 may raise lift linkage 30. A height 36 represents the height of payload carrier 16 at 100% lift, although the height of payload carrier 16 may be measured from other points on payload carrier 16.

Lift control device 24 may include one or more levers, buttons, switches, pedals etc. operatively coupled to lift mechanism 18. Lift control device 24 may be operatively coupled to lift cylinder 32 by an electrohydraulic type control system, a hydromechanical type control system, or any other type of control system. Lift control device 24 may be located at any suitable location on work machine 10. For example, lift control device 24 may be a lever, as shown in FIG. 1, mounted on or near operator seat 22 within operator station 20.

Figure 2:
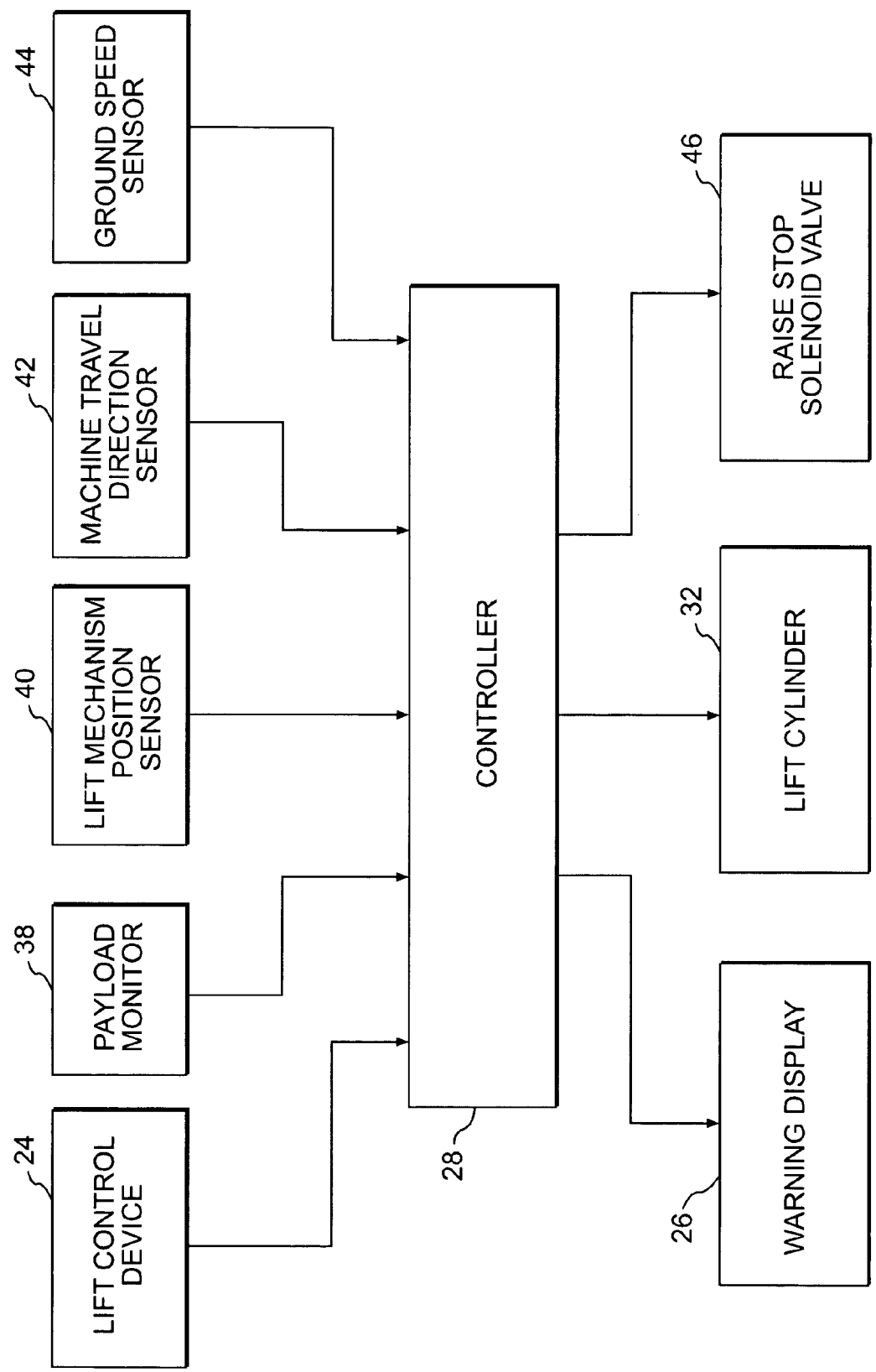
FIG. 2 is a block diagram representation of a payload overload monitoring system according to an exemplary disclosed embodiment.

Referring to FIG. 2, the payload overload control system may include controller 28, which may be configured to receive information from multiple sources, such as, for example, one or more of lift control device 24, a payload monitor 38, a lift mechanism position sensor 40, a machine travel direction sensor 42, and a ground speed sensor 44. Controller 28 may be configured to control one or more components of work machine 10, such as, for example, warning display 26, lift cylinder 32, and a raise stop solenoid valve 46.

Payload monitor 38 may be any sensor or system configured to determine a payload within payload carrier 16. For example, payload monitor 38 may include one or more sensors configured to measure hydraulic pressure within lift cylinder 32. Payload monitor 38 may record such pressure within lift cylinder 32 over a segment of lift, for example, between 30-60% of full lift. Payload monitor 38 may establish a curve from these pressure readings and compare it to a similar control curve indicative of pressures generated during the same 30-60% of lift with known payload. The control curve may be established by comparing cylinder pressures during a lift of an empty bucket with those of a lift with the known payload.

Lift mechanism position sensor 40 may be any sensor or mechanism configured to determine the height of lift mechanism 18. For example, lift mechanism position sensor 40 may include one or more sensors configured to determine the extension of lift cylinder 32, which may be correlated with the height of lift linkage 30.

Machine travel direction sensor 42 may be any sensor or mechanism configured to determine whether the selected travel direction of work machine 10 is forward, reverse, or neutral. For example, machine travel direction sensor 42 may be associated with a selector switch configured to select the travel direction of the work machine. Alternatively, machine travel direction sensor 42 may be a sensor associated with the transmission of work machine 10 that determines whether a forward gear or reverse gear is engaged or whether the transmission is in neutral. An output signal from machine travel direction sensor 42 may be transmitted to controller 28.

Ground speed sensor 44 may be any sensor or mechanism configured to determine the speed of work machine 10 relative to the ground. For example, ground speed sensor 44 may be a wheel speed sensor. Alternatively, ground speed sensor 44 may be a sensor associated with the transmission that indicates the rotational speed of one or more transmission components. For purposes of this disclosure, ground speed will be referred to with the convention that forward ground speed is positive and reverse ground speed is negative.

Controller 28 may be any processing device configured to receive information from sources, such as components of work machine 10. Controller 28 may be configured to receive commands from lift control device 24. Controller 28 may also be configured to receive information about the relative height of lift mechanism 18 from lift mechanism position sensor 40. Further, controller 28 may be configured to receive a signal indicative of which travel direction of work machine 10 is selected from machine travel direction sensor 42 and a ground speed from ground speed sensor 44. In addition controller 28 may be configured to receive a payload measurement or calculation from payload monitor 38.

Controller 28 may also be configured to control components of work machine 10 in response to information received from the sources discussed above. For example, controller 28 may be configured to control the height of lift mechanism 18 by regulating the extension of lift cylinder 32. Controller 28 may also be configured to trigger warning display 26 to display a warning message in response to information that it receives. In addition, controller 28 may activate raise stop solenoid valve 46 in order to limit the extension and/or power of lift cylinder 32. By limiting the power of lift cylinder 32 to extend, controller 28 may impose a lift limit on lift mechanism 18. This control may depend on whether certain conditions are met, as determined from the information received by controller 28. Exemplary control logic that may be followed by controller 28 will be discussed in greater detail below.

Controller 28 may include or be associated with a memory, which may be configured to store data collected for future analysis or use. For example, controller 28 may store information such as the number of overloads, the actual weights of those overloads, and whether or not a lift limit was imposed in each instance. This data may be sent via radio signals or another communication means to a central processing or monitoring center (e.g., the headquarters of the owner company). Alternatively, the data may be collected by downloading from controller 28 with a separate portable unit such as a laptop or a PDA.

Raise stop solenoid valve 46 may be configured to prevent or otherwise limit flow of hydraulic fluid associated with lift cylinder 32. In doing so, raise stop solenoid valve 46, when activated, may prevent lift cylinder 32 from extending. For example, raise stop solenoid valve 46 may be configured to cut off, divert, or otherwise control flow of pilot hydraulic fluid that controls the opening of the main hydraulic valve for lift cylinder 32. Therefore, lift cylinder 32 may maintain whatever height it had been raised to before raise stop solenoid valve 46 was activated. This may override any control input from lift control device 24 that may otherwise result in extension of lift cylinder 32.

Work machine 10 may include more than one raise stop solenoid 46, particularly if lift mechanism 18 includes more than one lift cylinder 32. Further, work machine 10 may include a different mechanism (other than a raise stop solenoid valve) for limiting lift of lift mechanism 18.

Warning display 26 may be located at any suitable place on work machine 10, such as on a dashboard in operator station 20. (See FIG. 1.). Warning display 26 may be a monitor screen such as a cathode ray tube (CRT), liquid crystal display (LCD), or plasma monitor, and may display additional information besides payload overload warnings and/or instructions. Alternatively, warning display 26 may include one or more indicator lights that may illuminate in the event of a payload overload. Warning display 26 may also utilize audible warnings as appropriate.

Warning display 26 may be configured to display a warning message indicating that a payload overload has been detected. Warning display 26 may also be configured to display instructions regarding possible actions that may be taken to eliminate the overload. For example, if a payload overload has been detected and work machine 10 is being operated in a manner where it would be desirable to impose a lift limit on lift mechanism 18 and/or change the payload in payload carrier 16, then warning display 26 may display an instructional message such as, "REDUCE PAYLOAD, LOWER LINKAGE." This kind of message may inform the operator that the machine is overloaded and that it is desirable under the present conditions to lower payload carrier 16 and/or dump some of the payload.

However, if a payload overload has been detected and work machine 10 is being operated in a manner that would make it undesirable to change the payload or impose a lift limit, then warning display 26 may simply display a warning message such as, "PAYLOAD OVERLOAD" to inform the operator that work machine 10 is carrying a payload above the amount for which the machine is rated. This kind of message may inform the operator that the machine is overloaded, thus indicating that it may be desirable to take additional care while handling the current payload.

Figure 3:
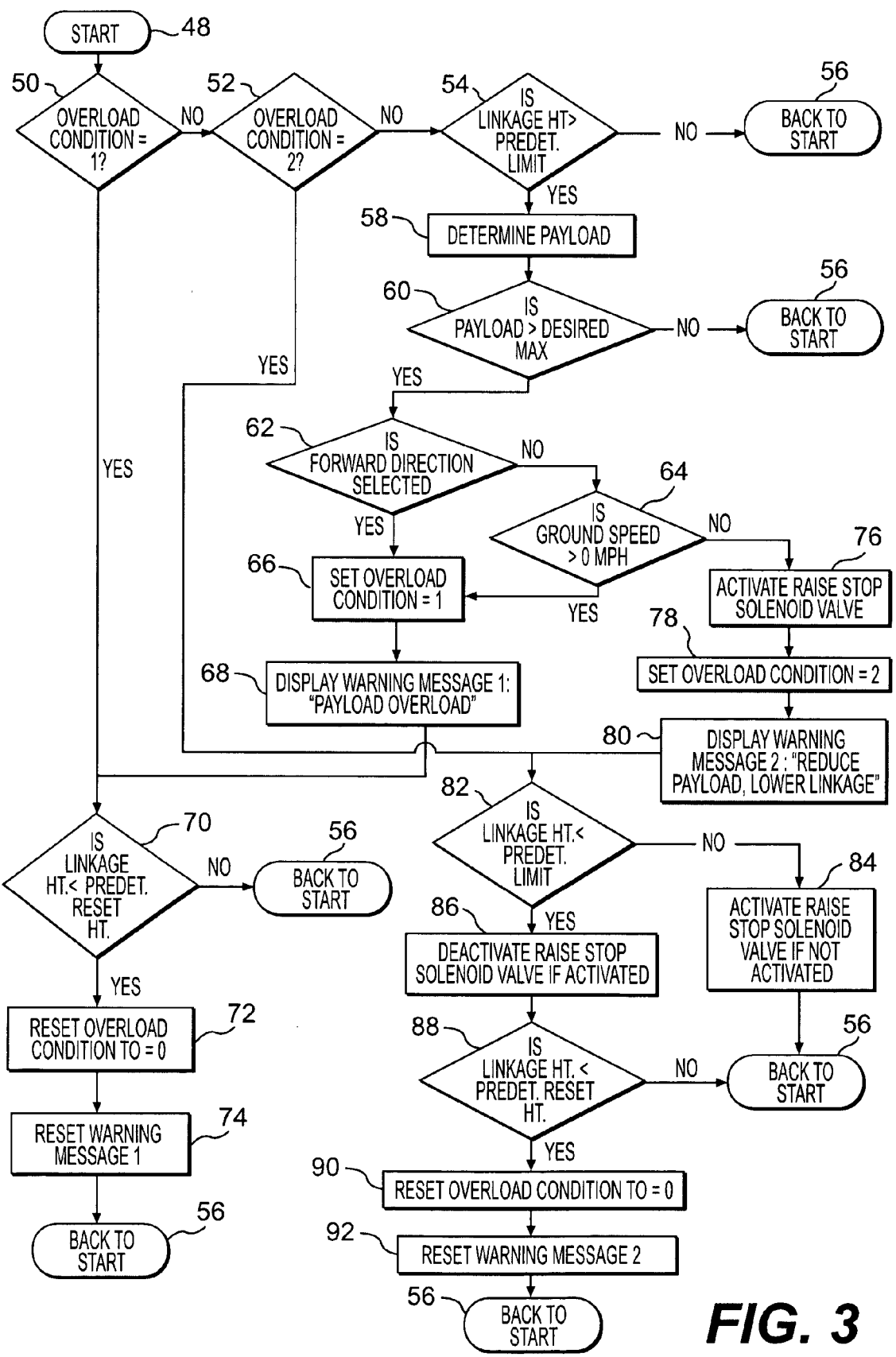
FIG. 3 is a flow chart illustrating control logic according to an exemplary disclosed embodiment.

Exemplary control logic for controller 28 is illustrated in FIG. 3 and will be discussed in greater detail in the following section.

INDUSTRIAL APPLICABILITY

The disclosed payload overload control system may be applicable to work machines, such as loaders and forklifts, for example, to limit certain payload handling operations of the machines. In one embodiment, a lift limit may be imposed on lift mechanism 18. Imposition of such limits can be based on any desired operating condition of work machine 10. For example, for certain applications, the limits may be imposed only when the machine is operating in a predetermined motion state (e.g., reverse travel or stationary). For other specified motions (e.g., forward motion), operational limits may be suspended, if desired.

Additionally, or alternatively, the payload overload control system may issue a payload overload warning signal in the event that a payload overload condition is detected. This warning signal may be provided to the operator of the machine independent from the application of any desired operational limits of the machine.

The disclosed system may also serve as a learning tool for inexperienced operators to learn the operational characteristics of the machine. For example, the system may help operators learn what types of conditions may result in a payload overload condition. The system may also help operators learn what types of operations may be appropriate when an overload condition exists.

FIG. 3 illustrates exemplary control logic for the disclosed system. At step 48, controller 28 may begin a payload overload control routine. At step 50 and step 52, controller 28 may determine whether any pre-existing overload conditions exist (this will be discussed in more detail below). If not, then controller 28 may proceed to determine the height of lift linkage 30 using lift mechanism position sensor 40 and compare the determined lift height to a predetermined lift limit (step 54). The predetermined limit may be a particular percentage of full lift (e.g., 60% lift) above which it may be undesirable to raise payload carrier 16 if it is overloaded. If the linkage height is at or below the predetermined limit, then the routine may loop back to start (step 56).

If the linkage height exceeds the predetermined limit, then controller 28 may determine a payload (step 58) using information from payload monitor 38. At step 60, controller 28 may compare the determined payload to a desired maximum payload, such as, for example, the rated payload for the machine or a particular percentage over the rated payload (e.g., 120% of rated payload or 95% of rated payload). If the determined payload is at or below the desired maximum payload, then the routine may loop back to start (step 56).

If the determined payload is greater than the desired maximum payload, controller 28 may then determine whether a forward direction is selected (step 62) using machine travel direction sensor 42. If a forward direction is not selected (i.e., neutral or reverse direction is selected), then controller 28 may determine whether the ground speed of work machine 10 is greater than zero (step 64) using information from ground speed sensor 44. If either a forward direction is selected or the ground speed is greater than zero, then it may be undesirable to impose a lift limit on lift mechanism 18. In such case, an overload condition may be set to "1" (step 66) and warning display 26 may display a first warning message, such as "PAYLOAD OVERLOAD." (Step 68.)

The first warning message and the payload overload condition may be reset (i.e., turned off) by lowering lift linkage 30 below a predetermined reset height, such as, for example, 30% lift. At step 70, controller 28 may determine whether the linkage height is below the reset height. If not, then the routine continues to display the warning message and may loop back to start (step 56). If the linkage height is below the reset height, then the overload condition may be reset to "0" (step 72), the first warning message may be reset (step 74) and the routine may loop back to start (step 56).

Referring back to step 70, a negative response to which may cause the routine to loop back to start if linkage 30 has not been lowered below the predetermined reset height, when the routine executes this step, the overload condition will be equal to "1," and therefore, execution of step 50 will result in bypassing some of the routine and skip straight to step 70.

Referring back to step 64, if the forward ground speed is determined to be less than or equal to zero, then controller 28 may activate raise stop solenoid valve 46 (step 76), thus imposing a lift limit on lift mechanism 18. At step 78, an overload condition may be set to "2." In addition, warning display 26 may be initiated to display a second warning message, such as, for example, "REDUCE PAYLOAD, LOWER LINKAGE." (Step 80.)

Raise stop solenoid valve 46 may be deactivated by lowering lift linkage 30 below the predetermined lift limit. At step 82, controller 28 may determine whether the linkage height is below the predetermined limit. If not, controller 28 may activate raise stop solenoid valve 46 if it is not already activated (step 84) and the routine continues to display the second warning message. If the linkage is below the predetermined limit, then controller 28 may deactivate the raise stop solenoid valve (step 86), thus removing the lift limit. However, at this point, a payload overload condition still exists (overload condition=2) so the lift limit is still in effect. Therefore, when the routine is looped back to start and proceeds to step 52, which asks if the overload condition is equal to 2, the answer will be "yes, thus prompting controller 28 to proceed to step 82. While lift has been re-enabled, the linkage may only be raised up to the lift limit, above which raise stop solenoid 46 will be activated (i.e., if step 82 is answered negatively). In order to reset the payload overload condition, and thus re-enable full lift, as well as reset the second warning message, the lift linkage may be lowered below the predetermined reset height.

At step 88, controller 28 may determine whether the lift height is less than the predetermined reset height. If not, then the routine may loop back to start (step 56). If the lift height is below the predetermined reset height, then the overload condition may be reset to zero (step 90), the second warning message may be reset (step 92), and the routine may loop back to start (step 56). The routine may loop back to the beginning on a constant or periodic basis. Alternatively or in addition, the routine may start from the beginning upon occurrence of one or more certain triggers. For example, the routine may start if the operator manually requests it to do so by, for example, entering a "Reweigh" command.

In addition, the threshold values for each condition discussed above may be variable. The predetermined lift limit, maximum payload, rate of forward ground speed, and reset height may be selectable by any of a number of people, such as, for example, an owner, service technician, operator, and/or renter. Also, whether these values are fixed or variable, the settings may differ from machine to machine. For example, these values may differ based on the type and/or size of the machine.

The predetermined lift limit may be any height, above which it may be undesirable to raise lift mechanism 18. In particular, the predetermined lift limit may be whatever height lift mechanism 18 is at when the payload is determined to exceed the desired maximum payload. That is, controller 28 may be configured to prevent lift mechanism 18 from being raised any higher than it is at the moment the payload is determined to be too high. Alternatively, the predetermined lift limit may be above or below this height. For example, if a payload overload is detected when lift mechanism 18 is at 70% lift, it may be desirable to impose a lift limit of 50% lift, such that once lift mechanism 18 is lowered below 50% lift, controller 28 may not allow it to be raised back up above 50% lift. On the other hand, if a payload overload is detected at 30% lift, it may be desirable and safe to allow some additional lift, to say, 40% lift.

It will be apparent to those skilled in the art that various modifications and variations can be made to the disclosed payload overload control system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A machine payload overload control system comprising:
    a payload carrier;
    a lift mechanism configured to raise and lower the payload carrier;
    a payload monitor configured to determine a payload in the payload carrier; and
    a controller configured to compare the determined payload with a predetermined maximum payload and to selectively control lift of the payload carrier by the lift mechanism by imposing a lift limit on the lift mechanism based on the comparison between the determined payload and the predetermined maximum payload.

2. The system of claim 1, wherein the controller is configured to impose the lift limit on the lift mechanism by activating at least one raise stop solenoid valve to regulate flow of hydraulic fluid to one or more components of the lift mechanism when the lift mechanism is raised above a predetermined limit.

3. The system of claim 2, wherein the controller is configured to deactivate the at least one raise stop solenoid valve when the lift mechanism is lowered below the predetermined limit.

4. The system of claim 1, wherein the controller is configured to remove the imposed lift limit when the lift mechanism is lowered below a predetermined reset height.

5. The system of claim 1, wherein the controller is configured to impose the lift limit when the determined payload exceeds the predetermined maximum payload.

6. The system of claim 5, wherein the lift limit corresponds to the height of the lift mechanism at the time the determined payload exceeds the predetermined maximum payload.

7. The system of claim 1, wherein the controller is configured to impose the lift limit on the lift mechanism when the determined payload exceeds the predetermined maximum payload and at least one of the following conditions are met
    a) the forward ground speed of the machine is no greater than zero; and
    b) a selected travel direction of the machine is selected from the group consisting of neutral and reverse.

8. The system of claim 7, wherein the controller is further configured to impose the lift limit on the lift mechanism when both of conditions a) and b) are met.

9. The system of claim 1, wherein the predetermined maximum payload is a predetermined percentage of a maximum rated payload of the machine.

10. The system of claim 9, wherein the predetermined maximum payload is higher than the maximum rated payload of the machine.

11. The system of claim 9, wherein the predetermined maximum payload is lower than the maximum rated payload of the machine.

12. The system of claim 1, further including a display, wherein the display is configured to display a message when the determined payload exceeds the predetermined maximum payload.

13. A method of controlling work machine payload overload comprising:
    determining a payload carried by a machine in a payload carrier;
    comparing the determined payload to a predetermined maximum payload;
    selectively controlling lift of the payload carrier by imposing a lift limit on a lift mechanism configured to lift the payload carrier based on the comparison.

14. The method of claim 13, wherein imposing the lift limit on the lift mechanism includes activating at least one raise stop solenoid valve to regulate flow of hydraulic fluid to one or more components of the lift mechanism when the lift mechanism is raised above a predetermined limit.

15. The method of claim 14, further including deactivating the at least one raise stop solenoid valve when the lift mechanism is lowered below the predetermined limit.

16. The method of claim 13, further including removing the imposed lift limit when the lift mechanism is lowered below a predetermined reset height.

17. The method of claim 13, further including imposing the lift limit when the determined payload exceeds the predetermined maximum payload.

18. The method of claim 17, wherein the lift limit corresponds to the height of the lift mechanism at the time the determined payload exceeds the predetermined maximum payload.

19. The method of claim 13, further including imposing the lift limit on the lift mechanism when the determined payload exceeds the predetermined maximum payload and at least one of the following conditions are met
    a) the forward ground speed of the machine is no greater than zero; and
    b) a selected travel direction of the machine is selected from the group consisting of neutral and reverse.

20. The system of claim 19, further including imposing the lift limit on the lift mechanism when both of conditions a) and b) are met.

21. The method of claim 13, wherein the predetermined maximum payload is a predetermined percentage of a maximum rated payload of the machine.

22. The method of claim 21, wherein the predetermined maximum payload is higher than the maximum rated payload of the machine.

23. The method of claim 21, wherein the predetermined maximum payload is lower than the maximum rated payload of the machine.

24. The method of claim 13, further including displaying a message when the determined payload exceeds the predetermined maximum payload.

25. A machine having a payload overload control system comprising:
- a power source;
- a traction system;
- a payload carrier;
- a lift mechanism configured to raise and lower the payload carrier;
- a payload monitor configured to determine a payload in the payload carrier; and
- a controller configured to compare the determined payload with a predetermined maximum payload and to impose a lift limit on the lift mechanism when the following conditions are met
  - a) the determined payload exceeds the predetermined maximum payload;
  - b) a selected travel direction of the machine is selected from the group consisting essentially of neutral and reverse or the determined ground speed in a forward direction is no higher than zero; and
  - c) the lift mechanism is raised above a predetermined limit;

the controller being further configured to remove the imposed lift limit when the lift mechanism is lowered below a predetermined reset height.

26. The machine of claim 25, wherein the controller is configured to impose the lift limit on the lift mechanism by activating at least one raise stop solenoid valve to regulate flow of hydraulic fluid to one or more components of the lift mechanism when the lift mechanism is raised above a predetermined limit.

27. The machine of claim 26, wherein the controller is configured to deactivate the at least one raise stop solenoid valve when the lift mechanism is lowered below the predetermined limit.

28. The system of claim 25, wherein the predetermined maximum payload is a predetermined percentage of a maximum rated payload of the machine.

* * * * *